UNITED STATES PATENT OFFICE 2,656,355

PURIFICATION OF CYCLONITE

Werner E. Bachmann, Ann Arbor, Mich., assignor to the United States of America as represented by the Secretary of War No Drawing. Application July 16, 1943,
Serial No. 495,080

10 Claims. (Cl. 260—248)

The present invention relates to a high explosive known as cyclonite, and more particularly to a new and improved method of purifying the same.

Cyclonite is an explosive of great ballistic power and brisance obtainable by the "direct nitration" (nitrolysis) of hexamethylenetetramine (hexamine) with 98% nitric acid. Within recent years two modern synthetic methods have been proposed for the manufacture of cyclonite, both of these processes involving the use of a fatty acid anhydride. The first of these involves the treatment of paraformaldehyde with ammonium nitrate in the presence of a fatty acid (acetic) anhydride (Schiessler and Ross, application Serial No. 444,254, filed May 23, 1942). The second method involves the treatment of hexamine or one of its salts with nitric acid and ammonium nitrate, also in the presence of a fatty acid anhydride such as acetic anhydride (my copending application Ser. No. 495,078 filed of even date herewith). As a matter of convenience, the cyclonite produced by either of the above indicated processes utilizing a fatty acid anhydride will hereinafter be referred to as "anhydride" cyclonite to distinguish the same from that obtained in the "direct nitration" process.

It has been found that "anhydride" cyclonite differs in certain important respects from that obtained by direct nitrolysis. Thus the cyclonite obtained in the direct nitrolysis process is a relatively pure compound melting at about 205° C., whereas "anhydride" cyclonite generally shows a lower melting point. It is therefore desirable to provide an efficient and safe method of purifying crude "anhydride" cyclonite and this may be said to constitute one of the objects of the present invention.

Another object is to provide a purification process which is applicable to crude cyclonite from any source, and which assures the production of a final product characterized by low residual acidity, high vacuum stability and high melting point.

A further object is a process of the character described which avoids the separation of cyclonite as a dry product at any stage in the process, thereby minimizing the hazards involved in handling a highly brisant and powerful explosive.

Still another object is the provision of a purification process which permits the control of the grist size of the cyclonite undergoing treatment, whereby either coarse or fine grained material may be obtained.

Other objects and advantages will be apparent as the invention is hereinafter more particularly described.

I have found that the foregoing objects may be attained in accordance with the present invention by forming a solution of cyclonite (either "anhydride" cyclonite or that obtained by direct nitrolysis) in a suitable organic solvent, thereafter adding water (either in the form of liquid or vapor) to the solution and evaporating or otherwise removing the volatile organic solvent, thereby leaving the purified cyclonite suspended in water.

A large number of solvents for cyclonite are known in the prior art and for convenience in reference, there will hereinafter be called "cyclonite-solvents." The particular cyclonite-solvent selected for carrying out the purification process of the present invention is largely a matter of choice, provided that the selected medium is essentially non-acidic in character. It is usually desirable, however, to employ a readily volatile solvent in order to reduce the time required for carrying out the process and also to reduce the cost of the process when carried out on a commercial scale. For these and other reasons, acetone and nitromethane constitute the preferred solvents. Nevertheless, it should be borne in mind that other solvents may be used, the following being mentioned by way of example: methyl ethyl ketone and its homologues such as methyl hexyl ketone; cyclohexanone; ethyl acetate and its homologues; nitropropane and the higher nitroparaffins; acetonitrile and many others.

In order more clearly to disclose the nature of the present invention, several illustrative examples will hereinafter be described in detail. It should be clearly understood, however, that this is done solely by way of example and is not to be construed as a limitation upon the spirit or scope of the appended claims.

Example I

Ten grams of crude "anhydride" cyclonite was dissolved in 40 cc. of hot nitromethane. The solution was heated with 5 cc. of water on the steam bath for three hours. Twenty-five cc. of warm water was added and the mixture was then heated under a slight vacuum on the steam bath in order to remove the nitromethane by distillation. Twenty-five cc. more of water was added and after cooling, the mixture was filtered. The yield was almost quantitative. The acidity of the purified product was 0.02% whereas the original material had an acidity of 0.1 to 0.3%. The vacuum stability of the product was also improved.

The nitromethane distilled in the foregoing process may be separated from the water in the distillate and reused. If desired, steam (wet or superheated) may be employed instead of water in the above example, with substantially the same results.

*Example II*

Fifty grams of crude "anhydride" cyclonite (acidity 0.25%) were dissolved in 500 cc. of hot acetone and wet steam was slowly (e. g., 3 hours) passed into the agitated solution until the gradually rising boiling point of the solution substantially reached the boiling point of water. About 250 cc. of water was present at the end of this operation. The product was filtered from the cooled reaction mixture; yield, 48.8 g.; acidity, 0.02%. The vacuum stability was greatly improved. The acetone in the distillate may be fractionated and reused.

It will be noted that one of the solvents employed in the foregoing examples (acetone in Example II) is miscible in all proportions with water, whereas the other solvent (nitromethane, Example I) is not. Both, however, are essentially non-acidic within the meaning of the present invention, and both are readily volatile (B. P. 56.1° C. and 101.9° C., respectively). In the case of water-immiscible solvents such as nitromethane, the solvent is removed at least partly by steam distillation.

The process of the present invention may be used either to increase or decrease the grist size of cyclonite. Generally speaking, by carrying out the solvent distillation step over a considerable period of time, the resulting cyclonite crystals will be large in grist size, whereas the rapid distillation of the solvent will produce relatively fine-grained cyclonite. Thus by suitable regulation of the process, grist control may be effected.

A further and highly interesting result of the instant purification technique arises from an altogether unexpected effect which the process in many cases produces on the impact sensitivity of "anhydride" cyclonite. As previously indicated, "anhydride" cyclonite differs in several important respects from cyclonite produced by direct nitrolysis. In addition to differences in melting points, etc., "anhydride" cyclonite is also usually more sensitve to impact than pure cyclonite (e. g., 50% detonation is obtained by a drop of 35 to 45 cm. with "anhydride" cyclonite, compared to 50 cm. for cyclonite obtained by "direct nitration," when tested on a standard impact machine having a 5 kg. weight). Indeed batches of "anhydride" cyclonite are occasionally obtained which exhibit a dangerous sensitivity (e. g., 4 to 10 cm.) If such batches of abnormally sensitive cyclonite are purified in accordance with the present invention, the sensitivity values are, in many instances, substantially improved. This interesting effect is illustrated in the following example.

*Example III*

During the preparation of numerous batches of "anhydride" cyclonite by the process described in my above identified application, one batch was obtained which exhibited a sensitivity in the crude, uncrystallized state, of 10 to 12 cm. This crude material was dissolved in boiling 85% acetone (i. e., acetone containing 15% water) in the proportions of 5.8 parts of acetone to one part of crude cyclonite. After the cyclonite had completely dissolved in the boiling acetone, the solution was vigorously agitated and wet steam was slowly passed through the solution (five to six hours) until the gradually rising boiling point of the solution substantially reached the boiling point of water. The solution was then immediately cooled to 30° C. in 1½ to 2½ hours, and the solution was separated by filtration from the solid cyclonite. A sample of the cyclonite was withdrawn, dried and then tested for impact sensitivity. The sample had a sensitivity rating of 42 to 43 cm., compared to a rating of 10 to 12 cm. for the crude material prior to purification.

The foregoing purification process has been used with a very large number of batches of cyclonite, and normal sensitivity has been noted in most instances. Nevertheless, it should be emphasized that an occasional batch of "anhydride" cyclonite may be obtained which exhibits abnormally high (i. e., dangerous) sensitivity, even after purification in accordance with the process of the present invention. It is therefore unwise to assume that "anhydride" cyclonite, when purified by the process of the present invention, will invariably possess "normal" sensitivity. Indeed the fundamental sensitivity factors for "anhydride" cyclonite are not fully known and therefore the testing of every batch of "anhydride" cyclonite for impact sensitivity is to be strongly recommended as a routine control procedure in the commercial production of this high explosive material.

In this same connection, reference is made to the copending application of John R. Johnson, Alfred T. Blomquist and Walter C. McCrone, Jr., application Serial No. 495,081, filed July 16, 1943, which describes and claims an improvement in the herein described purification process, which assures the production of normally sensitive "anhydride" cyclonite. This improved process, as more particularly described in said copending application, enables the operator to obtain normal sensitivity even with those batches of "anhydride" cyclonite which do not show a sensitivity improvement when treated in accordance with the present invention. Even with this improvement of the instant process, however, routine impact testing of each batch of cyclonite for sensitivity is to be recommended as a safety precaution.

It will be apparent to those skilled in the art that many variations may be made in the foregoing detailed description of the invention, without departing from the spirit and scope thereof. I therefore intend to be limited only in accordance with the following patent claims.

I claim:

1. A method of purifying crude cyclonite which comprises forming a solution of said crude cyclonite in an essentially non-acidic inert solvent therefor, adding water in the form of steam in controlled amounts to said solution whereby to produce a water-containing cyclonite solution, and thereafter gradually removing said cyclonite-solvent by distillation, whereby the cyclonite is separated in a purified form from said solvent in the presence of water.

2. The method of claim 1 wherein said water is added in the form of liquid.

3. The method of claim 1 wherein said water is added in the form of vapor.

4. A method of purifying crude cyclonite which comprises forming a solution of said crude cyclonite in an essentially non-acidic inert volatile organic solvent therefor, adding water in controlled amounts to said solution, whereby to produce a water-containing cyclonite solution, and thereafter gradually removing said cyclonite-solvent by distillation, whereby the cyclonite is separated in a purified form from said solvent in the presence of water.

5. A method of purifying crude cyclonite which comprises forming a hot concentrated solution of said cyclonite in a volatile ketone and passing steam into said solution for a period of time sufficient to distill said ketone and precipitate said cyclonite under water.

6. A method of purifying crude cyclonite which comprises forming a hot concentrated solution of said cyclonite in a volatile nitroparaffin, adding water to said solution and distilling said nitroparaffin, whereby to precipitate said cyclonite under water.

7. A method of purifying crude cyclonite which comprises forming a concentrated solution of said cyclonite in a volatile essentially non-acidic inert solvent and then displacing said solvent with water by passing steam through said solution whereby to precipitate said cyclonite under water.

8. The method of claim 7 wherein said solvent comprises acetone.

9. The method of claim 7 wherein said solvent comprises nitromethane.

10. A method of purifying crude cyclonite which comprises forming a concentrated solution of said cyclonite in hot acetone, passing steam into said solution for a period of time sufficient to raise the boiling point thereof substantially to the boiling point of water, cooling the resulting mixture, and separating the precipitated cyclonite from the supernatant liquid.

WERNER E. BACHMANN.

References Cited in the file of this patent

UNITED STATES PATENTS

| Number | Name | Date |
|---|---|---|
| 2,410,699 | Wyler | Nov. 5, 1946 |

FOREIGN PATENTS

| Number | Country | Date |
|---|---|---|
| 670,921 | Germany | 1937 |